US009589296B1

(12) United States Patent
Li et al.

(10) Patent No.: US 9,589,296 B1
(45) Date of Patent: Mar. 7, 2017

(54) MANAGING INFORMATION FOR ITEMS REFERENCED IN MEDIA CONTENT

(71) Applicant: Amazon Technologies, Inc., Reno, NV (US)

(72) Inventors: Yik Ping Li, Fremont, CA (US); Zaka Ur Rehman Ashraf, Pleasanton, CA (US); Joshua Karl Tang, San Luis Obispo, CA (US); Dennis James Taylor, San Luis Obispo, CA (US); Hannah Rebecca Lewbel, Campbell, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 941 days.

(21) Appl. No.: 13/711,050

(22) Filed: Dec. 11, 2012

(51) Int. Cl.
*G06Q 30/00* (2012.01)
*G06Q 30/06* (2012.01)

(52) U.S. Cl.
CPC ................. *G06Q 30/0641* (2013.01)

(58) Field of Classification Search
CPC ..... G06Q 30/00; G06Q 30/06; G06Q 30/0629
USPC .................... 705/26.62, 26.64; 348/461, 468
See application file for complete search history.

(56) References Cited

U.S. PATENT DOCUMENTS

| 5,898,594 A * | 4/1999 | Leason | G06Q 30/02 700/225 |
| 7,565,308 B1 * | 7/2009 | Bollay | G06Q 30/06 705/26.41 |
| 8,468,565 B2 * | 6/2013 | Thomas | G06Q 30/06 725/133 |
| 2002/0042755 A1 * | 4/2002 | Kumar | G06Q 10/06 705/26.4 |
| 2002/0073008 A1 * | 6/2002 | Dutta | G06Q 10/0875 705/37 |
| 2002/0156685 A1 * | 10/2002 | Ehrlich | G06Q 30/02 705/26.41 |
| 2004/0109087 A1 * | 6/2004 | Robinson | G06Q 30/06 348/461 |
| 2004/0117276 A1 * | 6/2004 | Kettler, III | G06Q 30/06 705/29 |
| 2006/0167754 A1 * | 7/2006 | Carro | G06Q 30/0601 705/59 |
| 2006/0237523 A1 * | 10/2006 | Carlson | G06F 19/3475 235/375 |
| 2007/0078850 A1 * | 4/2007 | Aziz | G06Q 30/0603 |

(Continued)

*Primary Examiner* — Seye Iwarere
(74) *Attorney, Agent, or Firm* — Seyfarth Shaw LLP; Ilan N. Barzilay; Chris A. Baxter

(57) ABSTRACT

Various embodiments enable a media playback device to present a user with the option to add items referenced in a media object, such as a movie, ebook, song, game, or application, to a wishlist for later purchase or sharing. An example system performs content analysis of the media object to determine which items are referenced in the media object and where they are located within the media object. Further, the system can query an electronic marketplace for more information about which specific types, sizes, colors, or other variations of the item are available, as well as information such as price, shipping cost, shipping time, and so forth. In a video media object, for example, the system can present a custom miniature storefront for various scenes or frames in the video that represents items present or referred to in the scenes or frames.

20 Claims, 10 Drawing Sheets

(56) References Cited

U.S. PATENT DOCUMENTS

| | | | |
|---|---|---|---|
| 2007/0088652 A1* | 4/2007 | Firmage | G06Q 30/0603 705/37 |
| 2007/0282703 A1* | 12/2007 | Sharpe | G06Q 30/0601 705/26.1 |
| 2008/0147557 A1* | 6/2008 | Sheehy | G06Q 30/0603 705/58 |
| 2008/0271083 A1* | 10/2008 | Robinson | G06Q 30/06 725/60 |
| 2008/0271084 A1* | 10/2008 | Robinson | G06Q 30/06 725/60 |
| 2008/0271086 A1* | 10/2008 | Robinson | G06Q 30/06 725/61 |
| 2008/0271089 A1* | 10/2008 | Thomas | G06Q 30/06 725/61 |
| 2008/0276285 A1* | 11/2008 | Robinson | G06Q 30/06 725/60 |
| 2008/0276286 A1* | 11/2008 | Robinson | G06Q 30/06 725/60 |
| 2009/0240518 A1* | 9/2009 | Borom | G06Q 30/02 705/14.1 |
| 2011/0093361 A1* | 4/2011 | Morales | G06Q 10/087 705/26.62 |
| 2012/0240152 A1* | 9/2012 | Thomas | G06Q 30/06 725/32 |
| 2013/0006805 A1* | 1/2013 | Ulli | G06Q 30/06 705/26.8 |
| 2013/0080289 A1* | 3/2013 | Roy | G06Q 30/06 705/26.8 |
| 2013/0103538 A1* | 4/2013 | Scholl | G06Q 30/0601 705/26.7 |
| 2013/0173402 A1* | 7/2013 | Young | G06Q 30/0631 705/14.73 |
| 2013/0262269 A1* | 10/2013 | O'Leary | G06Q 10/08 705/26.81 |
| 2013/0298168 A1* | 11/2013 | Thomas | G06Q 30/06 725/60 |

* cited by examiner

MANAGING INFORMATION FOR ITEMS REFERENCED IN MEDIA CONTENT

BACKGROUND

Media objects, such as electronic books (ebooks), movies, music, or applications, often include references to or depictions of specific products. For example, Coca-Cola may sponsor a product placement in a movie so that the main character is holding a can of Coca-Cola in one or more scenes of a movie. In other example, products are pictured or referenced without any product placement intent, but appear in the media objects nonetheless. As users are increasingly consuming media on smart devices that are network connected, or consuming media while simultaneously using a smartphone or tablet as a second or third screen, users are able to multitask while consuming content. Often users want to search for a particular product or object in a media object, but are unable to identify rapidly what the object is or how to call it, which leads to distractions from the media for the user, or leads to a missed opportunity for a seller of the object.

BRIEF DESCRIPTION OF THE DRAWINGS

Various embodiments in accordance with the present disclosure will be described with reference to the drawings, in which.

DETAILED DESCRIPTION

Figure 1:
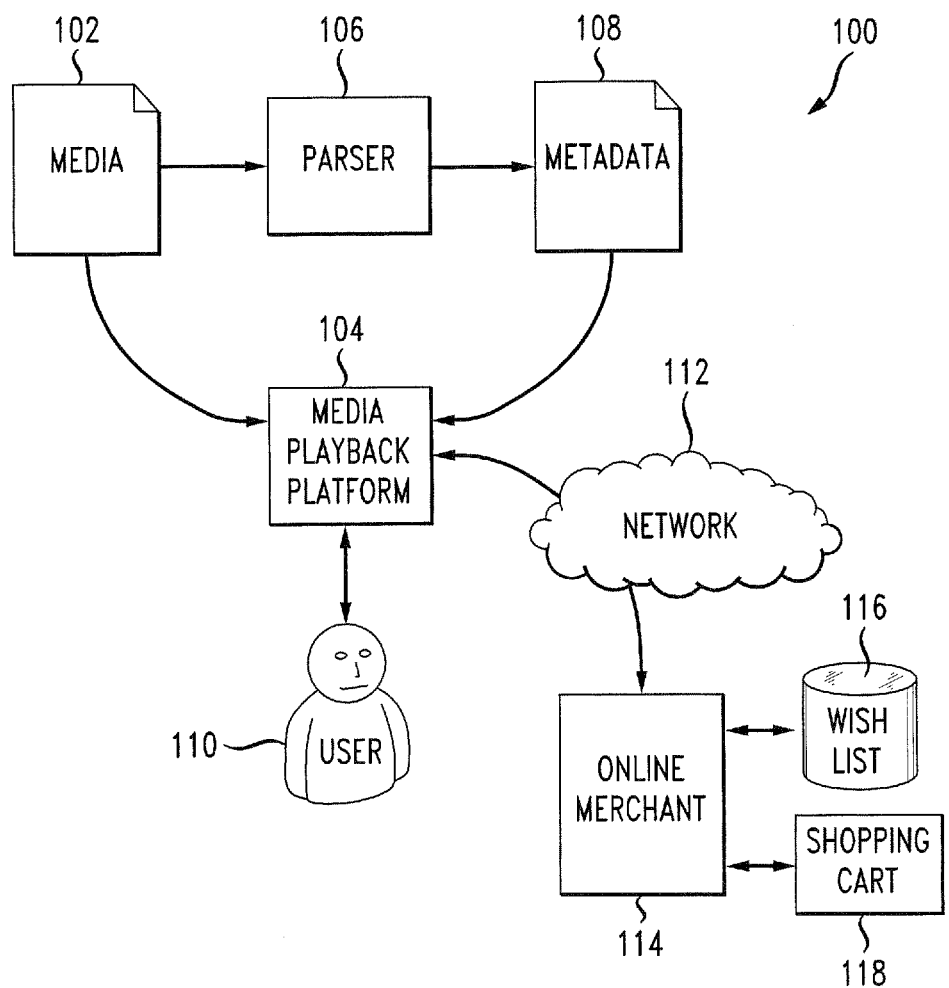
FIG. 1 illustrates an example architecture for offering for sale products identified in a media object.

Systems and methods in accordance with various embodiments of the present disclosure may overcome one or more of the aforementioned and other deficiencies experienced in media consumption and recognizing items (e.g., products) within a media object. In particular, various approaches enable a user to quickly and easily identify and purchase an item featured in a media object or add the item to a shopping cart or wish list. A media object can include static, dynamic, or interactive media. Examples of static media include electronic books (ebooks), video, audio, text, a web page, or an image. Examples of interactive media include applications, games, Flash content, interactive video, and so forth. While specific media object types are discussed herein, the principles set forth are applicable to virtually any media object, regardless of type.

For example, a user can view a movie in which the main character wears a specific type of NY Giants jersey. When the main character appears on the display, the system can present an indication that the jersey is available for purchase at an online retailer. The user can interact with the indication or provide some other input to place the jersey in the user's shopping cart or wishlist with the online retailer. In one embodiment, the products in the movie are recognized in advance and provided to a playback device or a companion device, such as a tablet or smartphone, for simultaneous presentation with the movie. The recognized products can be cached on the playback side or at a server. In another embodiment, the products in the movie are recognized on the fly, such as in the case of a streaming movie. However this on the fly approach may be simpler when the user is reading an ebook as opposed to watching a movie because of the slower rate of consumption and the smaller amount of information in an ebook versus a movie.

In another example, a user reads a page in an ebook that mentions by name the title of another book or movie. The system can provide indicate the title by changing the font size, type, color, thickness, shape, underlining, other visual aspect of the title, or can add an icon proximate to the title, so the user knows it is available for purchase. Then the user can interact with the title in a number of ways. For example, the user can highlight the item with keyboard input or tap on a touchscreen to view a popup of options to add the item to a wishlist or buy the item immediately from the electronic marketplace. In another variation, the system incorporates some kind of markup language so that when the user reads the book, the ebook reader provides an indication that the user can purchase from the online retailer with a single click or tap. In another variation, the system can provide a digest of all the items mentioned in the ebook, which the user can browse independently of reading the ebook. In this way, the user can view a summary of all items mentioned in a media source, and can add all or some of those to a wishlist or a shopping cart.

Various other functions and advantages are described and suggested below as may be provided in accordance with the various embodiments. FIG. 1 illustrates an example architecture 100 for offering for consumption (e.g., sale, purchase, rent, or download) products identified in a media object 102. A parser 106 processes the media object 102 to recognize items referenced in the media object 102. The parser 106 can process the media object 102 in different ways depending at least in part on the media type. For example, the parser 106 can process an ebook by performing a text analysis of the ebook contents and metadata, while the parser 106 can process a video by deconstructing all or some of the video frames and performing image recognition on individual video frames. In the case of static media objects, the parser 106 can process the media object once and cache the metadata 108. In the case of dynamic media objects, the parser 106 can operate in real time or substantially real time so that the metadata 108 is current with a user's consumption or participation with the dynamic media object. The media playback platform 104 plays the media object 102 for the user 110 or for multiple users 110, and receives metadata 108 from the parser 106. The media playback platform 104 incorporates the metadata 108 at the appropriate places to provide a suggestion or indication of detected items available for purchase through the electronic marketplace 114 within the media playback. In the case of an ebook, the media playback platform 104 can underline or highlight a word. In the case of a video, the media playback platform 104 can provide a graphical overlay on top of the video playback. In the case of an application, the media playback platform 104 can generate and display a popup window or other notification of an item available for purchase through the electronic marketplace 114. The user 110 selects the indication which triggers the media playback platform 104 to communicate with the electronic marketplace 114 via a network 112 to place the associated item in a wish list 116 or in a shopping cart 118 for later purchase, or to purchase the associated item instantly. The components shown in FIG. 1 can be incorporated as a single entity or divided between multiple entities. In one embodiment with multiple users 110, each individual user can contribute items to a group wishlist or group shopping cart. Users can share all or part of the group wishlist within the group or with others outside of the group.

Figure 2:
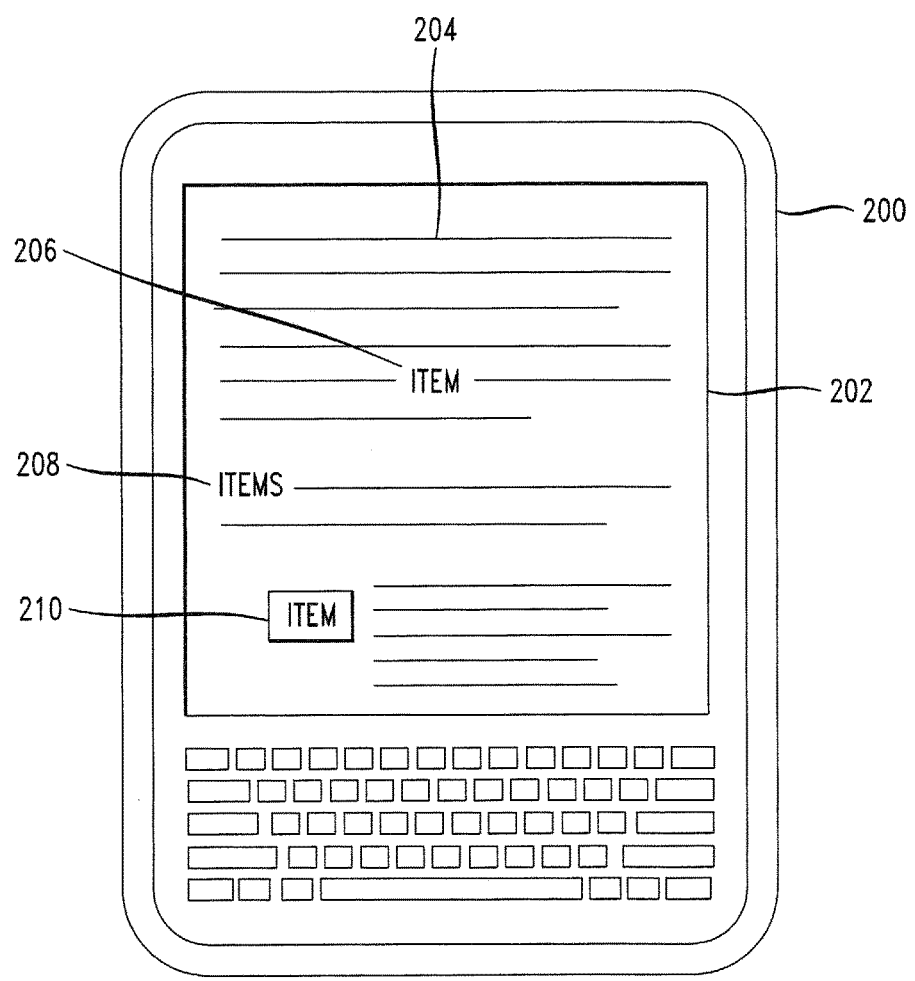
FIG. 2 illustrates an example media playback device with identified items in the media object.

FIG. 2 illustrates an example media playback device 200 with identified items in the media object. The illustrated playback device 200 includes a display 202 and displays a page 204 of an ebook, and can include a network connection to communicate with the electronic marketplace, not shown. The page 204 can include text, images, and other elements. The text of the page 204 can include item 206 which is displayed differently from the surrounding text to indicate that the user can purchase the item from the electronic marketplace. The text of the page 204 can also display a set of items 208 differently, which allows the user to purchase or add to a wishlist the set of items rather than a single item. Alternatively, selecting the set of items 308 may cause the media playback device 200 to prompt the user to disambiguate between or select a subset of the set of items. Further, the page 204 can recognize in an image 210 an item for purchase through the electronic marketplace and mark the entire image 210 or part of the image as being user selectable to place an object in the wish list or shopping cart or to make a purchase.

Figure 3:
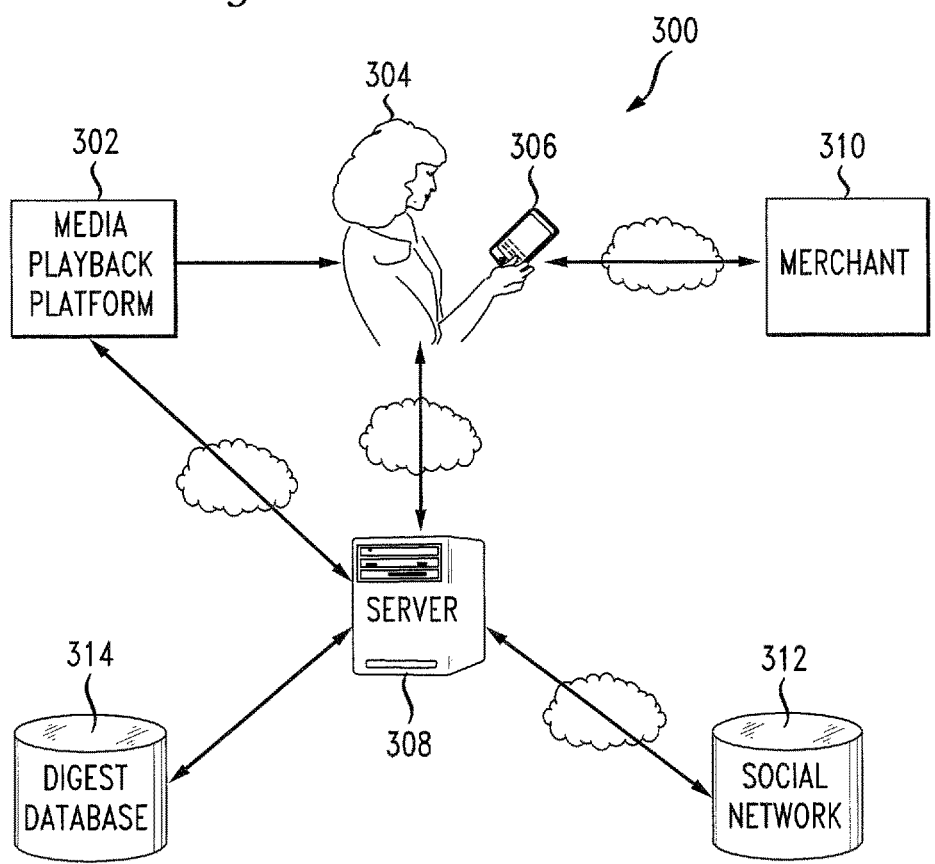
FIG. 3 illustrates an example architecture for generating a digest of products available for sale that are identified in a media object and for incorporating social network data.

FIG. 3 illustrates an example architecture 300 for generating a digest of products available for sale that are identified in a media object and for incorporating social network data. In this architecture 300, the media playback platform 302 displays a media object for a user 304, and also communicates with a server 308. As set forth above, the media playback platform can present various different types of media, such as video, audio, images, text, games, applications, and so forth. The server 308 fetches a digest of pre-processed recognized images for the media object from a digest database 314, and transmits the digest for the media object to a companion device 306 of the user 304, such as a smart phone, tablet computing device, smart remote control, or set-top box. The companion device 306 can display the entire digest for the user 304 to browse while viewing the media from the media playback platform 302, or the companion device 306 and/or the server 308 can synchronize the companion device 306 with playback of the media object so that the companion device 306 presents appropriate portions of the digest for the media object when corresponding portions of the media are played back. For example, the smartphone can listen to detect a position in a movie using audio or video fingerprinting. The user 304 can also interact with the companion device 306 to browse through the entire digest of items referenced in the media object regardless of which portion of the media object is presently displayed. When the user selects an item from the digest, the companion device 306 can directly contact the merchant 310 via a network or can communicate with the server 308 which relays a request for an item to the merchant 310 on behalf of the user 304. The user can browse through the digest of items on the companion device and optionally control the playback of the media object through the media playback platform 302 to show a portion of the media object related to an item in the digest. The user can provide parameters to the companion device 306 to restrict or focus which items are presented during media playback. For example, the user can request to view only items that are toys or that are intended for children under 12. The companion device 306 can filter the digest or the server 308 can filter the digest before sending items to the companion device 306.

In one variation, the server 308 also communicates with a social network 312. The server can customize, expand, modify, or reduce the digest for a particular media object for a particular user by comparing what other people, such as a user's contacts in a social network or other social network users having a similar profile to the user, selected from the media object or from related media objects. Thus, two different users may each view different configurations or lists of items from the same media object. For example, the server 308 can determine that ten of a user's friends have selected the jacket from the Top Gun movie, and provide additional emphasis on the jacket when presenting Top Gun to the user. The indication of the item can also include information describing the cause of the additional emphasis. The system can tailor how and which items are presented in the media object through social data from your social contacts or from aggregated data across a social network. Further, the server 308 can include explicit recommendations from others in the social network that are not included in the digest. For example, a particular phrase in a book may be an 'in joke' for a social network group, so one of the people in that social network group adds an item connected to the 'in joke' for that particular phrase. The system can share that new item for a targeted set of users in the group. Similarly, the social network 312 can provide additional guidance after items are added to the wishlist. For example, the wishlist can indicate not only items added to the list, but also how popular the item on the wishlist is among people with similar interests, or how many people actually purchased or expressed interest in the item. The wishlist can include data describing the source media object, and the exact location of the portion of the media object is related to an item in the wishlist.

The server 308 can consider different device types or capabilities of the companion device 306 or the media playback platform 302 when selecting which items to display for a particular media object. For example, the experience for a reflective screen e-reader is different than the experience of a back-lit tablet computing device because users mostly read books on e-readers instead of playing games, checking email, or running other tablet style apps. In one example, the system limits the immediate amount of user interaction for a user reading a book on an e-reader, which is suitable for the relatively slower pace of reading an ebook, whereas the system can provide a richer, faster-paced, and more interactive arrangement for video, where an item available or offered for sale may go off-screen quickly.

In yet another variation, a user profile of the user 304, which can be stored at the media playback platform 302, the server 308, the companion device 306 or other location, can influence the selection of items and which items are presented to the user. For example, if a child and an adult view the same media object, the system can highlight different recognized items for sale in the media object for each. For a child, the system may highlight toys, books, games, or candy, while the system may highlight for an adult items such as furniture, clothing, or cars. The user can enroll in the item suggestion system, and can enable or disable highlighting items at will. In another variation, the system can allow for parental or other controls, a confirmation dialog, or password protection on placing orders so that a child or other unauthorized user does not accidentally purchase an item or an entire set of items associated with a media object.

Figure 4:
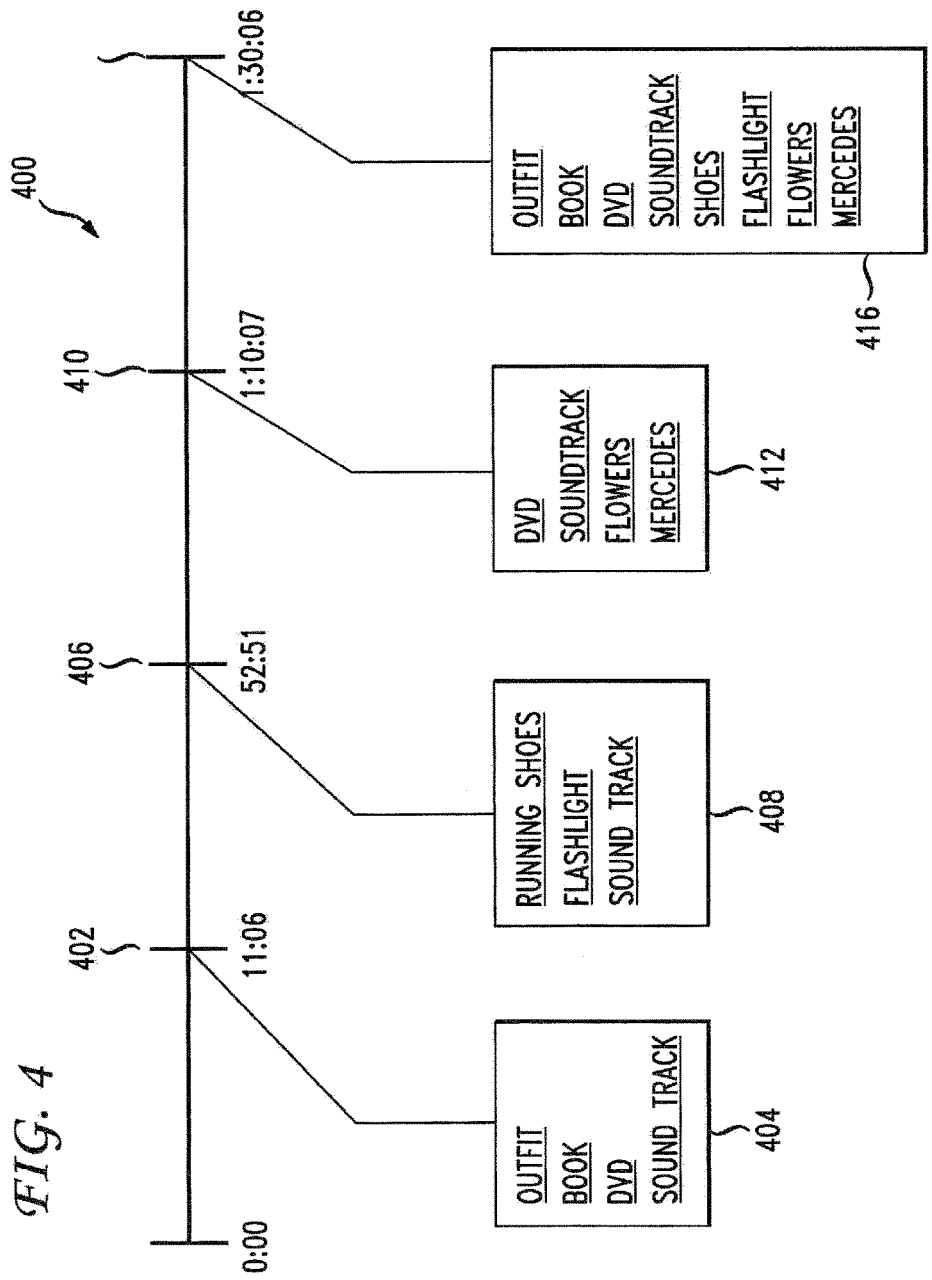
FIG. 4 illustrates an example timeline of a video media object with different 'store fronts' at different points in time in the video media object and a digest at the end of the video media object.

FIG. 4 illustrates an example timeline 400 of a video media object with different 'store fronts' at different points in time in the video media object and a digest at the end of the video media object. Specific lists of items can be tagged to certain scenes of the movie, so a user can browse and buy as they watch. The system can aggregate lists of items into collective notifications to avoid displaying notifications too frequently or in a way that distracts from the media playback, particularly in video playback. The timeline 400 includes multiple scene collections 402, 406, 410. Each scene collection has a corresponding list of items 404, 408, 412 which may be present at that exact instant in the timeline 400 of the media object, but may be present within some temporal threshold of that instant. Each of these lists 404, 408, 412 can be a mini storefront on a per-scene basis. At the end 414 of the media object, the system can insert a digest 416 of every item referenced in all the lists 402, 406, 410 for all the scenes. A content provider can sell advertising space companies to replace or augment product placement in a particular application, game, book, movie, scene, or song.

Figure 5:
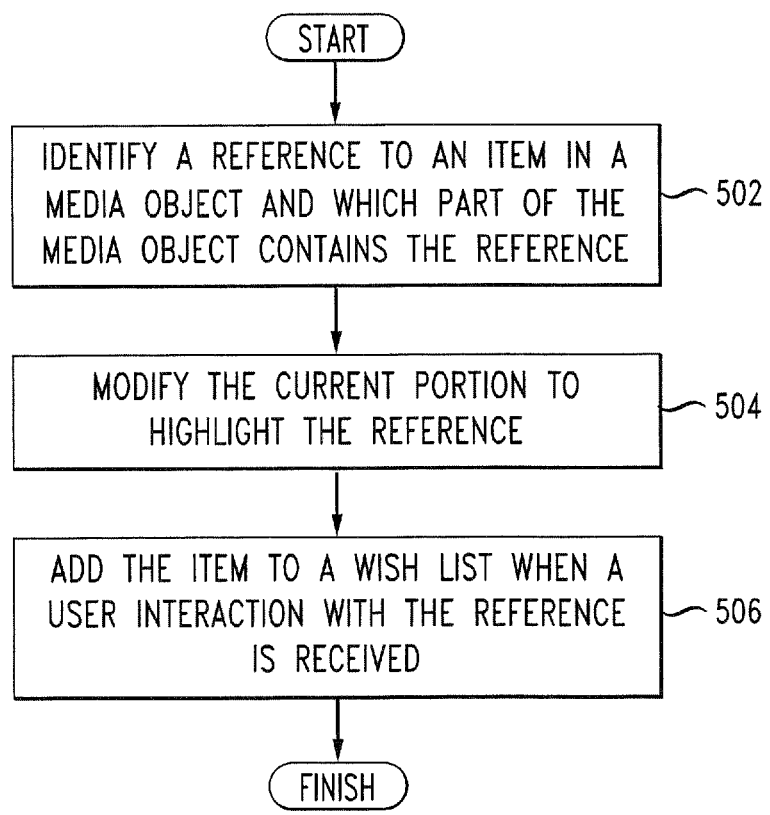
FIG. 5 illustrates an example method embodiment for displaying media while highlighting a reference to an item and adding selected items to a wishlist.

FIG. 5 illustrates an example method embodiment for displaying media while highlighting a reference to an item and adding selected items to a wishlist. An example system configured to practice the method first identifies in a media object a reference to an item available or offered for sale through an electronic marketplace 502. The system can ingest a media object, such as a book, scan the contents of the book, and determine out what the elements are, create metadata around the elements, and annotate the contents in an output file format. The system can detect links, tables, images, footnotes, and so forth. In some variations, the system implements a dictionary based lookup that runs characters through lookup process to see if the characters matched words in a dictionary. A word-map table maps a position on screen to a word in the text. Because the system already runs heuristics on the book content that same information can be used to query a table for matches in a list of popular items, a list of items sold on the online retailer, a list of descriptive terms of items for sale, a list of product categories, and so forth. In some variations, people can correct the heuristics and automatically generated descriptions, or verify product identification. The system can optionally incorporate community tagging. People can tag certain products with additional metadata, and the system can extract product data from the community tagging. In the case of an application or game, the system can perform image processing or screen scraping on the display or on a frame buffer, for example, to obtain data to analyze for items. If the user visits a website or uses an app, the system can scrape screen-captured images, a cache, files associated with the app, source of a website, and so forth to detect and add items to the digest of items which can be added to a wishlist. In yet another variation, the system can receive data from media content publishers reflecting already detected items which may or may not be already embedded in the media content. The system can receive item identifications from multiple supplemental data streams.

The system can automatically identify references to items based on their image by doing image processing, whether the image is a movie still frame or a page in a book, for example. The system can determine that the image contains an item by performing an image matching algorithm, or by requesting that a user confirm that a particular image contains an item and what item is. In one example, the system can rely on standard markers or symbols indicating a product, such as ISBN codes for books or UPC symbols for certain retail items. The system can incorporate these standard markers into metadata describing the items.

As a user consumes the media object, the system detects that a current portion of the media object contains the reference, and modifies a presentation of the current portion to indicate the reference to the user 504. The reference to the item can be integrated directly in to content of the media object. The reference to the item can be an item appearing or being mentioned in the media content, without a direct link or a hyperlink to the item. Upon receiving a user interaction with the reference, the system adds the item available or offered for sale through the electronic marketplace to a wish list associated with the user at the electronic marketplace 506. The system can optionally present to the user an interactive interface associated with the reference, receive input from the user via the interactive interface, and add the item to the wish list based on the input. After adding the item to the wish list, the system can remove any modifications of the reference, such as unhighlighting the reference. In this way, the system can remove a potential distraction from the media object because the user has already completed interacting with that reference and no longer needs to be reminded of the reference. In one example, the highlighting is removed, but the reference remains interactive so that the user can still interact with the reference if desired. However, in another example, the system removes the highlighting and deactivates user interactions for the reference.

Figure 6:
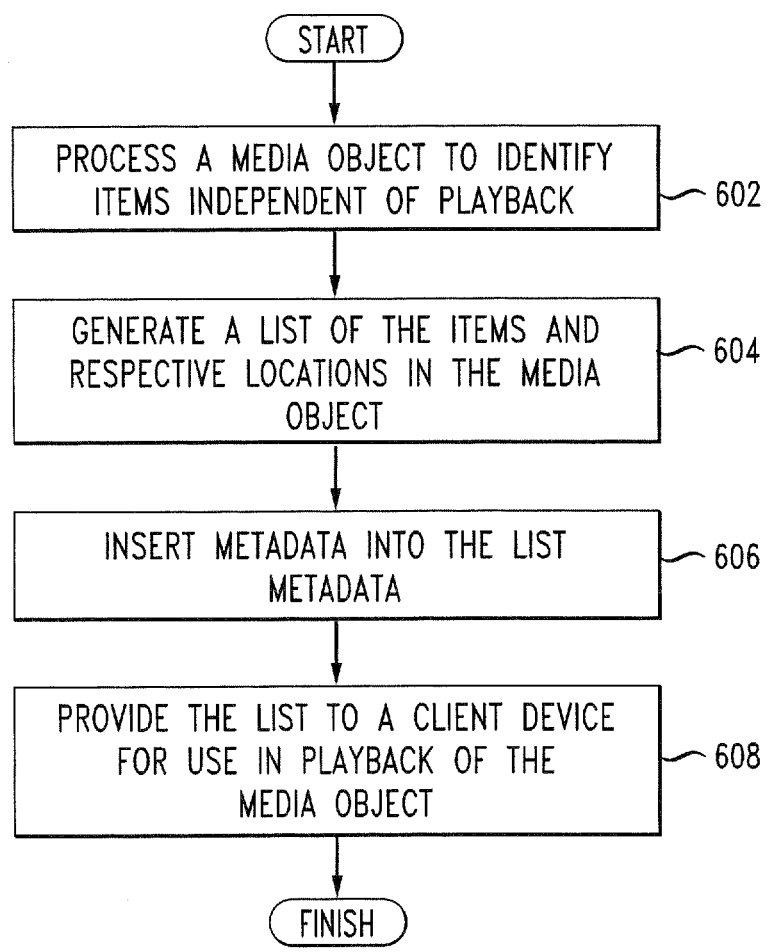
FIG. 6 illustrates an example method embodiment for recognizing items in a media object offline, and providing part of the list of items to a client during playback.

FIG. 6 illustrates an example method embodiment for recognizing items in a media object offline, and providing part of the list of items to a client during playback. The example system processes a media object, independently from playback of the media object, to identify items in the media object 602. The media object can be an electronic book, video, audio, text, an image, an application, or a game. The system can process the media object prior to playback of the media object.

The system generates a list of the items, wherein the list identifies a respective location in the media object for each item 604, and inserts into the list metadata correlating each item in the list with at least one product at an electronic marketplace 606. The system can further insert into the list, for each item, a category and an alternate item. The system provides the list to a client device for use in playback of the media object, such that during playback of the media object the client device can suggest adding products to a wish list at the electronic marketplace 608. The system can provide the list to a companion device other than the client device for simultaneous display while the client device plays back the media object. If the media object is a game, the client device can suggest adding products to the wish list via an in-game action, such as pressing a particular combination of buttons, interacting with a specific menu item or object within the game, or performing a particular action such as crouching twice.

Figure 7:
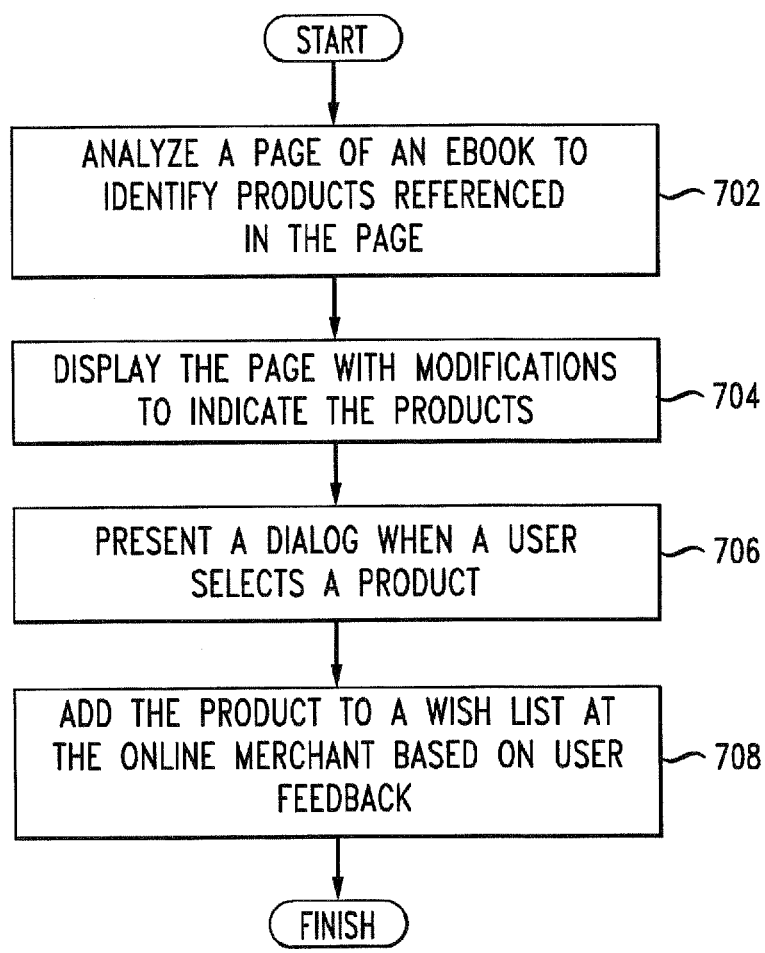
FIG. 7 illustrates an example method embodiment for parsing a page of an electronic book in real time to identify items which are available from an electronic marketplace.

FIG. 7 illustrates an example method embodiment for parsing a page of an electronic book in real time to identify items that are available from an electronic marketplace. The system analyzes contents of the page of the electronic book, in response to a request to display a page of an electronic book, to identify products in an electronic marketplace that are referenced in the page 702. The system can analyze contents of the page of the electronic book by parsing the page to extract previously generated tags. A content producer or a server can insert these previously generated tags. The system can verify that the products are currently available through the electronic marketplace once the products are identified. If the products are not available through the electronic marketplace, the system can either not include those products, or can search for an alternate source, such as another retailer. The system can add the products even if the product is not now available, such as if the product is on back-order.

The system displays the page with modifications to indicate the products within the contents of the page 704. In one scenario, the system reserves space on the page for a QR code or other scannable code or indicia, and generates the QR code associated with at least one of the products that leads to a product page. Then the system can track when a scanning device accesses the address of the product page. Upon receiving a user selection of a product on the page, the system presents a dialog to the user for the product 706. The system can present the dialog by presenting a pop-up window proximate to a modified region of the page. Based on input received via the dialog, the system adds the product to a wish list at the electronic marketplace, adding the product to a shopping cart at the electronic marketplace, or beginning a purchase of the product at the electronic marketplace 708. The product includes at least one of a group of products, a product category, a product type, or a product attribute.

Figure 8:
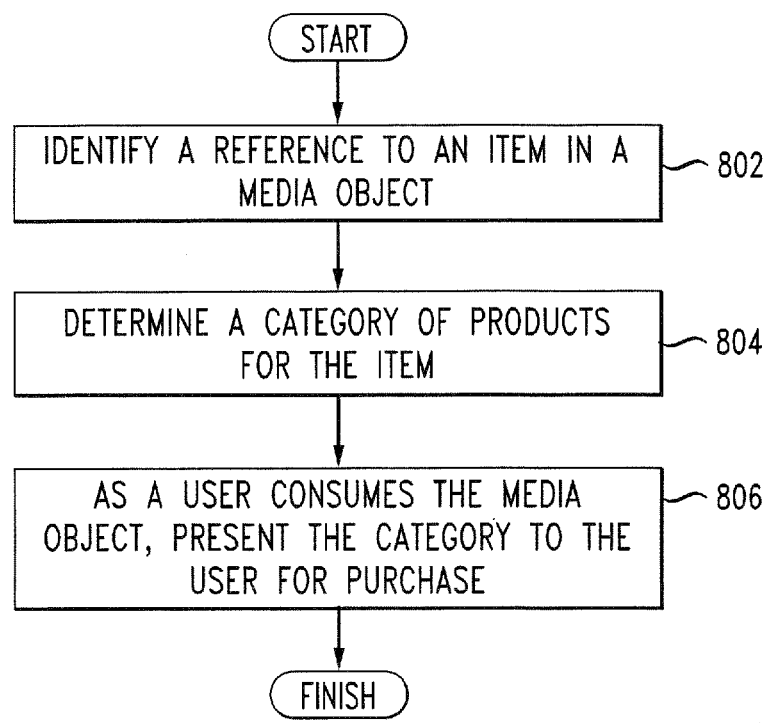
FIG. 8 illustrates an example method embodiment for identifying a reference to a category or group of items in a media object.

FIG. 8 illustrates an example method embodiment for identifying a reference to a category or group of items in a media object. The example system identifies in a media object a reference to an item 802. Items identified in a media object may not be a specific movie title or book title, but can include generic items, such as a notebook, carrots, an area rug, or a Nike shoe. The system can recognize a Star Wars logo, and generate or select a list of items related to Star Wars, such as toy light sabers, collectible cards, movie tickets, movies, books, Halloween costumes, or stationery. The system can generate a list at a web or network address, and associate that address with the Star Wars logo to allow a user to view all the different content associated with that logo or with multiple items in the media object. The system determines that the item is associated with a category of products available for sale through an electronic marketplace 804. As a user consumes the media object, detecting that a current portion of the media object contains the reference, and upon receiving a user interaction with the reference, presenting at least part of the category of products to the user for purchase through the electronic marketplace 806. The system can present an interactive interface within which the user can navigate to and select a specific product. In another variation, the system receives a selection of the specific product, and inserts the specific product in to a wishlist at the electronic marketplace. The system can receive a selection of the specific product, and complete a purchase of the specific product on behalf of the user.

Figure 9:
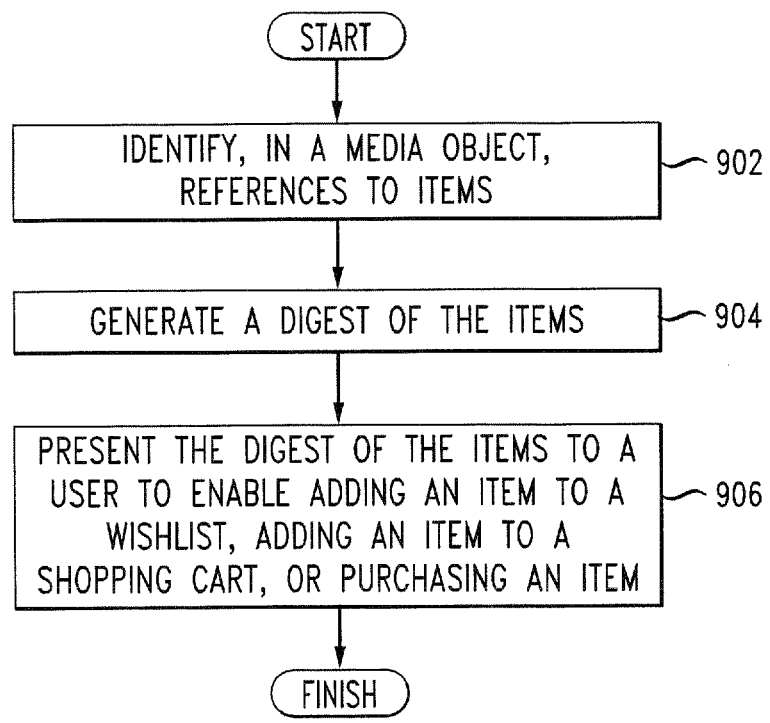
FIG. 9 illustrates an example method embodiment for providing a digest of items recognized in a media object.

FIG. 9 illustrates an example method embodiment for providing a digest of items recognized in a media object. The example system identifies, in a media object, references to items 902. The system determines that each of the items is associated with a respective product available for sale through an electronic marketplace, and generates a digest of the items, wherein the digest includes metadata describing the items and positions of the references within the media object 904. When the system determines that one of the items does not satisfy a similarity threshold to a profile of the user, the system can select an alternate product from the electronic marketplace based on the profile as a replacement for the one of the items. The system presents the digest of the items to a user via a user interface that allows the user to perform one of adding an item to a wishlist, adding an item to a shopping cart, or purchasing an item 906. The system can present the digest of items to the user via the user interface along with purchase data of related items by others within a social circle of the user. The system can select a subset of items in the digest based on a profile of the user, and present the subset of items to the user via the user interface. The profile can include age, gender, demographic information, purchase history, preferences, family information, or social network information.

An example electronic computing device that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device has a display screen (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements on the front of the device and at least one image capture element on the back of the device. It should be understood, however, that image capture elements could also, or alternatively, be placed on the sides or corners of the device, and that there can be any appropriate number of capture elements of similar or different types. Each image capture element may be, for example, a camera, a charge-coupled device (CCD), a motion detection sensor or an infrared sensor, or other image capturing technology.

As discussed, the device can use the images (e.g., still or video) captured from the imaging elements to generate a three-dimensional simulation of the surrounding environment (e.g., a virtual reality of the surrounding environment for display on the display element of the device). Further, the device can utilize outputs from at least one of the image capture elements to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone on the front side, one microphone on the back, and one microphone on or near a top or side of the device. In some devices there may be only one microphone, while in other devices there might be at least one microphone on each side and/or corner of the device, or in other appropriate locations.

The device in this example also includes one or more orientation- or position-determining elements operable to provide information such as a position, direction, motion, or orientation of the device. These elements can include, for example, accelerometers, inertial sensors, electronic gyroscopes, and electronic compasses.

The example device also includes at least one communication mechanism, such as may include at least one wired or wireless component operable to communicate with one or more electronic devices. The device also includes a power system, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
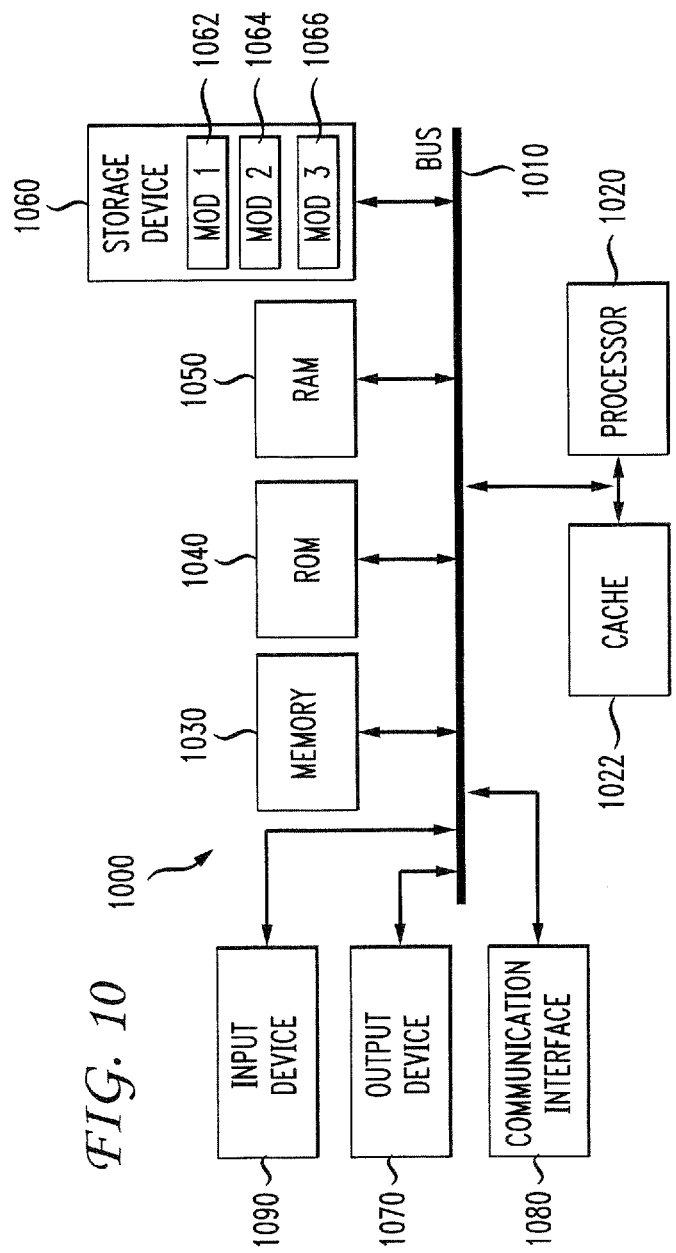
FIG. 10 illustrates an example computing device that can be used to implement aspects of various embodiments.

A brief introductory description of a basic general purpose system or computing device in FIG. 10, which can be employed to practice the concepts, is disclosed herein. The variations described herein can be implemented using one or more of the systems described below.

With reference to FIG. 10, an exemplary system includes a general-purpose computing device 1000, including a processing unit (CPU or processor) 1020 and a system bus 1010 that couples various system components including the system memory 1030 such as read only memory (ROM) 1040 and random access memory (RAM) 1050 to the processor 1020. The computing device 1000 can include a cache 1022 of high speed memory connected directly with, in close proximity to, or integrated as part of the processor 1020. The computing device 1000 copies data from the memory 1030 and/or the storage device 1060 to the cache 1022 for quick access by the processor 1020. In this way, the cache provides a performance boost that avoids processor 1020 delays while waiting for data. These and other modules can control or be configured to control the processor 1020 to perform various actions. Other system memory 1030 may be available for use as well. The memory 1030 can include multiple different types of memory with different performance characteristics. It can be appreciated that the disclosure may operate on a computing device 1000 with more than one processor 1020 or on a group or cluster of computing devices networked together to provide greater processing capability. The processor 1020 can include any general purpose processor and a hardware module or software module, such as module 1 1062, module 2 1064, and module 3 1066 stored in storage device 1060, configured to control the processor 1020 as well as a special-purpose processor where software instructions are incorporated into the actual processor design. The processor 1020 may essentially be a completely self-contained computing system, containing multiple cores or processors, a bus, memory controller, cache, etc. A multi-core processor may be symmetric or asymmetric.

The system bus 1010 may be any of several types of bus structures including a memory bus or memory controller, a peripheral bus, and a local bus using any of a variety of bus architectures. A basic input/output (BIOS) stored in ROM 1040 or the like, may provide the basic routine that helps to transfer information between elements within the computing device 1000, such as during start-up. The computing device 1000 further includes storage devices 1060 such as a hard disk drive, a magnetic disk drive, an optical disk drive, tape drive or the like. The storage device 1060 can include software modules 1062, 1064, 1066 for controlling the processor 1020. Other hardware or software modules are contemplated. The storage device 1060 is connected to the system bus 1010 by a drive interface. The drives and the associated computer-readable storage media provide non-volatile storage of computer-readable instructions, data structures, program modules and other data for the computing device 1000. In one aspect, a hardware module that performs a particular function includes the software component stored in a tangible computer-readable storage medium in connection with the necessary hardware components, such as the processor 1020, bus 1010, display 1070, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 1000 is a small, handheld computing device, a desktop computer, or a computer server.

Although the exemplary embodiment described herein employs the hard disk 1060, other types of computer-readable media which can store data that are accessible by a computer, such as magnetic cassettes, flash memory cards, digital versatile disks, cartridges, random access memories (RAMs) 1050, read only memory (ROM) 1040, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 1000, an input device 1090 represents any number of input mechanisms, such as a microphone for speech, a touch-sensitive screen for gesture or graphical input, keyboard, mouse, motion input, speech and so forth. An output device 1070 can also be one or more of a number of output mechanisms known to those of skill in the art. In some instances, multimodal systems enable a user to provide multiple types of input to communicate with the computing device 1000. The communications interface 1080 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1020. The functions these blocks represent may be provided through the use of either shared or dedicated hardware, including, but not limited to, hardware capable of executing software and hardware, such as a processor 1020, that is purpose-built to operate as an equivalent to software executing on a general purpose processor. For example the functions of one or more processors presented in FIG. 10 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1040 for storing software performing the operations described below, and random access memory (RAM) 1050 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 1000 shown in FIG. 10 can practice all or part of the recited methods, can be a part of the recited systems, and/or can operate according to instructions in the recited tangible computer-readable storage media. Such logical operations can be implemented as modules configured to control the processor 1020 to perform particular functions according to the programming of the module. For example, FIG. 10 illustrates three modules Mod1 1062, Mod2 1064 and Mod3 1066 which are modules configured to control the processor 1020. These modules may be stored on the storage device 1060 and loaded into RAM 1050 or memory 1030 at runtime or may be stored in other computer-readable memory locations.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. At least one server comprising:
   at least one processor; and
   memory storing instructions which, when executed by the at least one processor, cause the at least one processor to:
   receive, from a first device, a media object, the media object not processed, prior to receipt from the first device, to indicate items recognized within the media object;
   identify, in the media object and not in response to a user selection, data corresponding to items;
   determine that each of the items is associated with a respective product available for sale through an electronic marketplace;
   generate a digest of the items, wherein the digest comprises metadata, the metadata including product data correlating each item with the respective product and describing each item and a respective position of data corresponding to each item within the media object; and
   cause the digest of the items and at least a portion of the media object to be presented via a user interface on a second device allowing the second device to perform, using the product data, one of: adding an item to a wishlist, adding an item to a shopping cart, or purchasing an item.

2. The at least one server of claim 1, wherein the instructions, further cause the at least one processor to:
   determine that one of the items does not satisfy a similarity threshold to a profile of the user; and
   select an alternate product from the electronic marketplace based on the profile as a replacement for the one of the items.

3. The at least one server of claim 1, wherein the digest is presented to the user via the user interface with purchase data of related items by others within a social circle of the user.

4. The at least one server of claim 1, wherein the instructions causing the at least one processor to present the digest further including instructions to:
   select a subset of items in the digest based on a profile of the user; and
   present the subset of items to the user via the user interface.

5. The at least one server of claim 4, wherein the profile comprises at least one of age, gender, demographic information, purchase history, preferences, family information, social network information, or membership in a group or organization.

6. A method, comprising:
   receiving, from a first device, a media object, the media object not processed prior to receipt from the first device, to indicate items recognized within the media object;
   identifying, in the media object and not in response to a user selection, data corresponding to an item;
   determining that the item is associated with a product available for sale through an electronic marketplace;
   generating a digest that includes the item, wherein the digest comprises metadata, the metadata including product data correlating the item with the product and describing the item and a position of the data corresponding to the item within the media object; and
   causing the digest and at least a portion of the media object to be presented via a user interface on a second device.

7. The method of claim 6, wherein the data corresponding to the item is included in content of the media object.

8. The method of claim 7, wherein the data corresponding to the item is a depiction of the item.

9. The method of claim 7, wherein the data corresponding to the item is a reference to the item.

10. The method of claim 6, wherein the user interface allows the user to perform one of: adding the item to a wishlist, adding the item to a shopping cart, or purchasing the item.

11. The method of claim 6, wherein identifying the data corresponding to the item further comprises performing image recognition on at least part of the media object.

12. The method of claim 6, wherein identifying the data corresponding to the item occurs prior to a playback of the media object.

13. A device, comprising:
    at least one processor;
    memory storing instructions which, when executed by the at least one processor, cause the at least one processor to:
    receive, from a first device, a media object, the media object not processed prior to receipt from the first device, to indicate items recognized within the media object;
    identify, in the media object and not in response to a user action, data corresponding to an item;
    determine that the item is associated with a product available for sale through an electronic marketplace;
    generate a digest that includes the item, wherein the digest comprises metadata, the metadata including product data correlating item with the product; and
    cause the digest and at least a portion of the media object to be presented on a second device via a user interface allowing the second device to perform, using the product data, one of: adding the item to a wishlist, adding the item to a shopping cart, or purchasing the item.

14. The device of claim 13, wherein the metadata describes the item and a position of the reference within the media object.

15. The device of claim 13, wherein the metadata describes an alternate item.

16. The device of claim 15, wherein the alternate item is selected from the electronic marketplace based on a profile of the user.

17. The device of claim 16, wherein the profile comprises at least one of age, gender, demographic information, purchase history, preferences, family information, social network information, or membership in a group or organization.

18. The device of claim 13, wherein the digest is presented to the user via the user interface with purchase data of related items by others associated with a profile of the user.

19. The device of claim 13, wherein the digest is presented as a pop-up window via the user interface.

20. The device of claim 13, wherein the instructions further cause the at least one processor to:

determine that the item does not satisfy a similarity threshold to a profile of the user; and select an alternate product from the electronic marketplace.

* * * * *